United States Patent
Smith

(10) Patent No.: US 7,615,254 B2
(45) Date of Patent: Nov. 10, 2009

(54) FLUID-APPLIED AIR AND MOISTURE BARRIER AND CEMENTITIOUS BOND BREAKER AND SYSTEM

(76) Inventor: Christopher L Smith, 6710 Wright Rd. NW, Atlanta, GA (US) 30328

(*) Notice: Subject to any disclaimer, the term of this patent is extended or adjusted under 35 U.S.C. 154(b) by 0 days.

(21) Appl. No.: 11/365,797

(22) Filed: Mar. 1, 2006

(65) Prior Publication Data

US 2007/0042196 A1    Feb. 22, 2007

Related U.S. Application Data

(60) Provisional application No. 60/710,133, filed on Aug. 22, 2005.

(51) Int. Cl.
- *B05D 3/00* (2006.01)
- *B05D 1/40* (2006.01)
- *A61K 8/73* (2006.01)
- *C08L 5/00* (2006.01)

(52) U.S. Cl. .......................... 427/331; 524/27

(58) Field of Classification Search ............ 524/27; 427/331
See application file for complete search history.

(56) References Cited

U.S. PATENT DOCUMENTS

| | | | | |
|---|---|---|---|---|
| 2,570,892 A * | 10/1951 | White | ............. | 523/131 |
| 3,560,480 A * | 2/1971 | Kruger | ............. | 536/120 |
| 4,150,083 A * | 4/1979 | Baehr | ............. | 264/256 |
| 4,174,228 A * | 11/1979 | Boberski et al. | ............. | 106/686 |
| 4,568,000 A * | 2/1986 | Middleton | ............. | 222/107 |
| 4,749,730 A * | 6/1988 | Jimenez | ............. | 524/27 |
| 5,143,780 A * | 9/1992 | Balassa | ............. | 428/294.7 |
| 5,583,214 A * | 12/1996 | Partain, III | ............. | 536/84 |
| 5,595,625 A * | 1/1997 | Fishel et al. | ............. | 156/308.2 |
| 5,621,026 A * | 4/1997 | Tanaka et al. | ............. | 524/52 |
| 5,629,366 A * | 5/1997 | Rogiers | ............. | 524/56 |
| 5,696,174 A * | 12/1997 | Chao et al. | ............. | 521/50 |
| 5,719,244 A * | 2/1998 | Farwaha et al. | ............. | 526/238.2 |
| 5,739,196 A * | 4/1998 | Jenkins et al. | ............. | 524/460 |
| 5,880,182 A * | 3/1999 | Minomiya et al. | ............. | 524/5 |
| 5,897,411 A * | 4/1999 | Stark et al. | ............. | 428/511 |
| 5,922,124 A * | 7/1999 | Supplee | ............. | 106/802 |
| 5,962,571 A * | 10/1999 | Overbeek et al. | ............. | 524/460 |
| 5,964,293 A * | 10/1999 | Chatterji et al. | ............. | 166/294 |
| 6,080,802 A * | 6/2000 | Emmons et al. | ............. | 523/205 |
| 6,238,766 B1* | 5/2001 | Massett et al. | ............. | 428/99 |
| 6,312,576 B1* | 11/2001 | December | ............. | 204/484 |
| 6,406,755 B1* | 6/2002 | Kindt et al. | ............. | 427/403 |
| 6,534,572 B1* | 3/2003 | Ahmed et al. | ............. | 524/275 |
| 6,589,660 B1* | 7/2003 | Templeton et al. | ............. | 428/452 |
| 6,894,136 B2* | 5/2005 | Markham et al. | ............. | 528/3 |
| 6,941,720 B2* | 9/2005 | DeFord et al. | ............. | 52/783.14 |

(Continued)

FOREIGN PATENT DOCUMENTS

WO    WO 2004046228 A1 *   6/2004

*Primary Examiner*—Mark Eashoo
*Assistant Examiner*—Liam J Heincer
(74) *Attorney, Agent, or Firm*—Schmid PA

(57) ABSTRACT

Disclosed is a liquid formulation and system for forming an air and moisture barrier for application to the sheathing behind exterior cladding of a structure. The air and moisture barrier includes a cementitious bond breaker for use in conjunction with a cementitious siding. The applied-liquid barrier forms a continuous-seamless structural barrier to both air and moisture while having vapor permeance.

6 Claims, 4 Drawing Sheets

U.S. PATENT DOCUMENTS

| | | | |
|---|---|---|---|
| 6,988,343 B2 * | 1/2006 | Gleeson et al. | 52/459 |
| 7,276,549 B2 * | 10/2007 | Liu et al. | 524/423 |
| 2002/0160210 A1 * | 10/2002 | Kiik et al. | 428/458 |
| 2003/0139522 A1 * | 7/2003 | Koppers et al. | 524/525 |
| 2004/0024144 A1 * | 2/2004 | Solomon et al. | 526/72 |
| 2005/0009954 A1 * | 1/2005 | Gebhard et al. | 523/210 |
| 2005/0065242 A1 * | 3/2005 | McGee et al. | 523/402 |
| 2005/0081751 A1 * | 4/2005 | Mauchamp et al. | 106/148.1 |
| 2006/0036014 A1 * | 2/2006 | Hogan et al. | 524/494 |
| 2006/0053738 A1 * | 3/2006 | Jaffee | 052/741.3 |
| 2006/0172648 A1 * | 8/2006 | Amos et al. | 442/378 |
| 2006/0185557 A1 * | 8/2006 | Garska et al. | 106/484 |
| 2006/0196663 A1 * | 9/2006 | Keller | 166/285 |
| 2006/0223935 A1 * | 10/2006 | Fasano et al. | 524/501 |

* cited by examiner

FLUID-APPLIED AIR AND MOISTURE BARRIER AND CEMENTITIOUS BOND BREAKER AND SYSTEM

RELATED APPLICATION

This application relies upon U.S. Provisional Patent Application Ser. No. 60/710,133 filed Aug. 22, 2005.

TECHNICAL FIELD

The present invention generally relates to an air and moisture barrier for application to the sheathing and concrete masonry behind the exterior cladding of a structure and in greater detail to a barrier including a cementitious bond breaker for use in conjunction with a cementitious plaster or mortar.

BACKGROUND

Moisture problems in walls can be attributed to three principal mechanisms: bulk water intrusion, water vapor diffusion, and air leakage. In recent years, control of air movement has become recognized as a major factor in determining building performance. Depending on the local climate, air leakage through walls can result in excessive efflorescence, spalling of masonry, frozen pipes, condensation and ice buildup in cavities, wet and dysfunctional insulation, mold growth as well as rain penetration, high energy costs and poor control of the building environment.

Air leakage is the uncontrolled movement of air through the building envelope. This movement of air into a building (infiltration) and out of a building (exfiltration) is caused by pressure differences produced by wind, stack or chimney effect and mechanical pressurization. Air leakage may follow such paths as holes or openings through the envelope, for example, cracks or joints between infill components and structural elements or through porous materials such as concrete block and porous insulation materials.

The method commonly used to mitigate such problems is the use of an air barrier, which is a material that offers a higher resistance to the passage of air than most other materials. Preferably, such barriers have some degree of water vapor permeance. Various types of vapor and air barriers exist for such a use. Examples of air barriers having little vapor permeance include polyethylene film, aluminum foil, some paint products, some insulation mastic adhesives and some mastic coatings have been used as vapor barriers.

Commonly known as "house wraps or sheet goods", some preformed sheet membrane products offer a partial solution to providing a water vapor permeable or breathable air barrier system such as Tyvek spunbonded polyolefin sheet as manufactured and sold by DuPont. This type of product presents a number of difficulties in achieving an air barrier system in that multiple accessory products are required in order to create a continuous plane of air tightness throughout the building envelope. These accessories include mechanical fasteners, nails or screws, with large diameter metal or plastic plates or washers to secure the membrane, seaming tape to seal the joints of the membrane and flexible flashing for all transition areas such as tie-ins to window frames. The use of a tape and multiple mechanical fasteners which puncture the membrane compromise the integrity of the system. In addition, air barrier membranes should be structural or rigid so that they will not deform under changes in air pressure. Deformation will change the volume of a wall cavity, which could result in a pumping action. The pumping action could result in movement of humid air and defeat the original purpose of the air barrier. An alternative to sheet or membrane barriers is the application of a fluid-applied air and moisture barrier to the sheathing or masonry behind the exterior cladding of a structure. Liquid-applied barriers form a continuous-seamless structural air and moisture barrier. Fluid-applied barriers are rolled or sprayed on to the sheathing/masonry, thus there are no fastener holes where water penetration may occur. Additionally, there is no potential for mislapping or tearing as with many sheet goods. As liquid-applied barriers are bonded to the structure, either the sheathing or masonry wall, they resist deformation. Furthermore, a fluid-applied barrier in combination with venting and compartmentalizing enables the pressure behind the cladding to equalize or modify with the pressure outside. This reduces the risk of rainwater penetration caused by pressure differentials. This pressure equalizing or moderating effect is only possible when the air barrier is structural, as is the case with a fluid applied barrier.

Cementitious compounds such as portland cement stucco, which are made up almost exclusively of sand and cement, can be porous and prone to moisture penetration. The rigid nature of stucco also makes it prone to cracking which can increase the exposure to bulk water penetration or leaking. The porous nature of stucco facades can allow moisture to damage the underlying substrate if a barrier is not used. Moisture barriers are typically employed between a slip-sheet that is adjacent to the metal lath holding the stucco façade and the underlying substrate. Slip sheets are required when there is movement between the cementitious façade and the underlying substrate. Differing expansions and movements between the two can cause cracking in the cementitious façade. A slip sheet allows the façade to essentially expand and contract independently of the substrate. The addition of the slip sheet in cementitious facades adds an additional cost that is not occurred in other siding applications.

Thus, it would be advantageous to have an air and moisture barrier having the advantages of a liquid-applied barrier without need to deploy a slip sheet in the use of cementitious facades.

SUMMARY

The present invention provides a liquid formulation for forming an air and moisture barrier for application to the sheathing or masonry behind exterior cladding of a structure. The air and moisture barrier further comprises a cementitious bond breaker for use in conjunction with a cementitious siding such as stucco. The applied-liquid barrier forms a continuous-seamless structural barrier to both air and moisture while having vapor permeance. Limited vapor permeability will assist in the drying of a wall while resisting vapor penetration at lower pressures.

In greater detail, the liquid-applied air and moisture barrier includes a cementitious bond breaker formulation for a cementitious siding application. The formulation includes a latex polymer and a cement retarder. The retarder may be selected from the group consisting essentially of carbohydrates, sulfur containing materials, hydroxycarboxylic acids, triethanolamines and combinations thereof. The latex may be either elastomeric or non-elastomeric. The formulation may further include a dispersant that may be anionic, cationic, nonionic, amphoteric and combinations thereof. Further additives such a preservative, thickener, coalescent and a defoamer may be added to the formulation.

Additionally, the fluid applied air and moisture barrier and cementitious bond breaker formulation for a cementitious siding application may be described by the percentage of its components. The formulation may contain between about 20% to about 60% by weight of a latex polymer and between about 1% to about 10% by weight of a cement retarder. The formulation may further include on a weight percent up to about 3% of a dispersant, between about 5% to about 60% of a filler and up to about 3% of a defoamer.

A system is further provided for forming an air and moisture barrier on a structure. The formed barrier substantially lacks adhesion to a cementitious product such that a slip sheet is not needed. The barrier is formed by applying to the structure a liquid formulation including a latex polymer and a cement retarder. The liquid barrier may be applied by spraying, rolling, and/or brushing the barrier onto the structure. The system includes applying a reinforced mesh over joints in the structure and sealing the joints with a water and air barrier compound.

DRAWINGS

DETAILED DESCRIPTION

Figure 1:
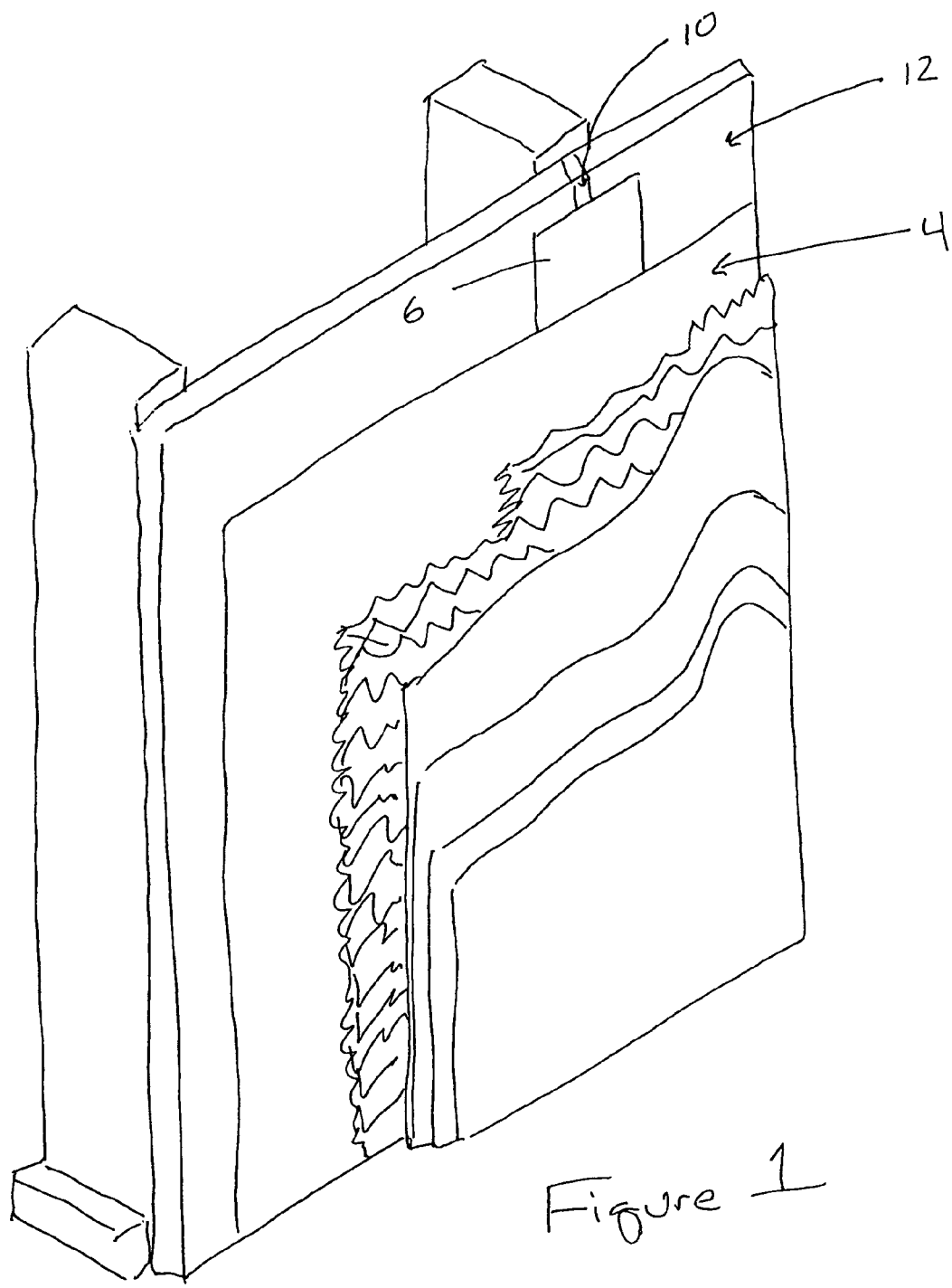
FIG. 1 depicts the installation of a stucco façade including the air and moisture barrier applied to the sheathing and a stucco finish applied to a metal lath.

Disclosed is a liquid formulation and system for forming an air and moisture barrier for application to a substrate. Typically, the substrate is the sheathing or masonry behind the exterior cladding of a structure. The cladding comprises a cementitious composition such as stucco. The air and moisture barrier further includes a cementitious bond breaker such that the barrier does not substantially bond to the cladding. Thus, where there is direct contract between the substrate and cementitious façade such as in the use of direct applied stucco and EIFS applications, a bond breaking barrier would not be applicable. The applied-liquid barrier forms a continuous-seamless structural barrier to both air and moisture while having vapor permeance.

The liquid formulation includes a latex polymer and a cement retarder. The retarder may be selected from the group consisting essentially of carbohydrates, sulfur containing materials, hydroxycarboxylic acids, triethanolamines and combinations thereof. The latex may be either elastomeric or non-elastomeric.

The cement retarder may be defined as any compound that retards the hardening of cement. Typically, a cement retarder is categorized as a cement additive (a cement additive) which is mixed with cement for the purpose of retarding the setting and hardening of mortar or concrete by means of retarding hydration of cement. Further examples of cement retarders include lead oxide, boron oxide, borax, zinc chloride, zinc oxide, magnesium silicofluoride and other inorganic retarders, polyhydroxy compounds (sugar, an alcohol, methyl cellulose, ethyl cellulose, poly(vinyl alcohol), dextrin, etc.), poly(sodium acrylate), a hydroxycarboxylate, a lignosulfonate, gluconic acid or its salt, pyruvic acid, .alpha.-ketoglutaric acid or other keto acids, and other organic retarders.

The cement retarder may be added to the formulation on a weight percent basis of the formulation from about 1% to about 10%. In a further embodiment the retarder may be added in an amount between about 2% to about 7%. An additional embodiment includes the retarder being added in an amount between 3% and 5%.

The term "Latex" includes elastomeric or amorphous thermoplastic polymer particles. The main elastomeric latexes are: natural rubber, styrene butadiene, polyacrylonitrile butadiene and polychloroprene. The primary thermoplastic latexes are: polyvinyl acetate, polystyrene, polyvinylchloride, polyacrylates, or their copolymers. There are many latexes which are suitable for the present invention. More specifically, latexes such as an acrylate polymer, commercially available from Rohm and Haas Co. under the trade designation "Rhoplex HA-8," an ethylene/vinyl acetate/acrylate terpolymer, commercially available from Air Products and Chemicals under the trade designation "Flexbond 153," and a vinyl acetate/dioctyl maleate copolymer, commercially available from Air Products and Chemicals under the trade designation "Flexbond 149," are all acceptable latexes under the present invention.

The latex may be added to the formulation on a weight percent basis of the formulation from about 20% to about 60%. In a further embodiment the latex may be added in an amount between about 30% to about 50%. An additional embodiment includes the retarder being added in an amount between 35% and 45%.

Dispersants are added to the barrier liquid to ensure the stability of the resulting formulation. Suitable dispersants are all those customarily employed as both protective colloids and emulsifiers. Examples of suitable protective colloids are polyvinyl alcohols, cellulose derivatives or vinylpyrrolidone-containing copolymers. It is of course also possible to use mixtures of emulsifiers and/or protective colloids. Emulsifiers used may be anionic, cationic or nonionic in nature. Of course, where mixtures of surface-active substances are used, the individual components must be compatible with one another, and this can be checked in cases of doubt through a few preliminary experiments. In general, anionic emulsifiers are compatible with one another and with nonionic emulsifiers. Where anionic emulsifiers are employed, their counterion is preferably a sodium ion. Examples of customary emulsifiers are ethoxylated mono-, di- and trialkylphenols, ethoxylated fatty alcohols and alkali metal and ammonium salts of alkyl sulfates of sulfuric acid, monoesters of ethoxylated alkanols and of ethoxylated alkylphenols of alkylsulfonic acids and of alkylarylsulfonic acids. Mention may be made, by way of example, of the alkali metal and/or ammonium salts of dodecylbenzenesulfonic acid and of the alkali metal and/or ammonium salts of the sulfuric acid monoester of ethoxylated dodecanol.

Dispersants may be added to the formulation on a weight percent basis of the formulation from about 0% to about 10%. In a further embodiment dispersants may be added in an amount between about 2% to about 7%. An additional embodiment includes the retarder being added in an amount between 3% and 6%.

Pigments and fillers may be added to the formulation. Suitable fillers and pigments include mica, kaolin, heavy spar, talc, quartz sand, quartz flour, chalk, titanium dioxide, dolomite, ground barytes, hydrophobized, silica, iron oxide and other color pigments. If desired it is also possible to use organic pigments for coloring purposes.

While the total amount of filler may be added to the formulation in amount up to about 60% by weight, the filler content may contain a variety of classifications. For example, a coarse filler may be added in amounts up to about 20% by weight of the formulation.

In addition to fillers and pigments, the formulation may comprise defoamers, thickeners, coalescent and preservatives. In general, the defoamer is typically a polyacid and can be included in an amount up to about 3% by weight of the formulation. The preservatives may include both a dry film and wet preservative and comprise up to about 6% of the formulation.

The system for forming an air and moisture barrier on a structure includes the application of the above described formulation to a substrate. The application of the formulation creates a film that acts as a barrier to moisture and air. Furthermore, the applied film contains the cement retarder that prevents a cementitious façade from adhering to the film or barrier.

Figure 2:
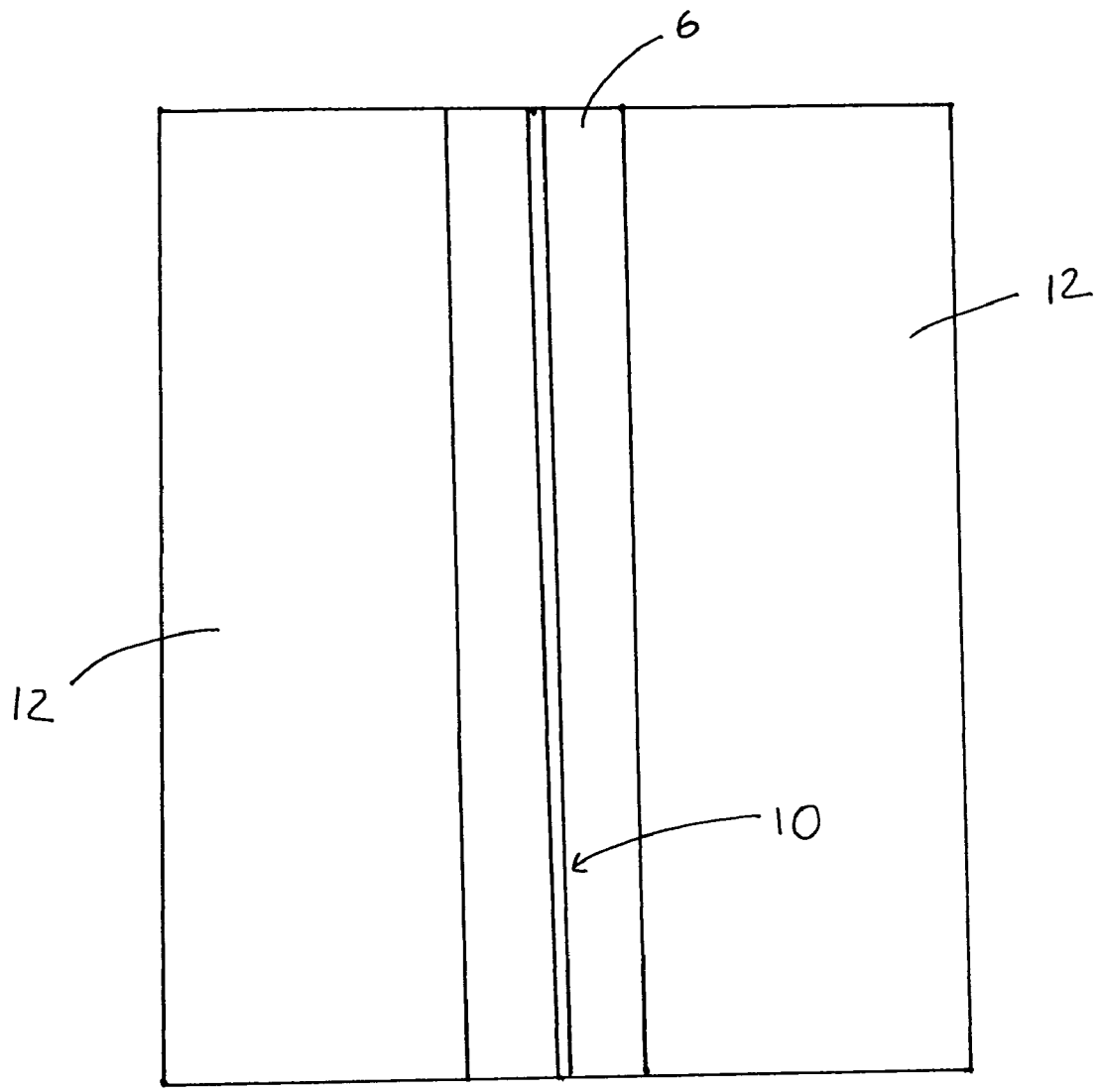
FIG. 2 illustrates the system of applying the air and moisture barrier wherein the step applying a mesh to the joint in the sheathing is shown.
Figure 3:
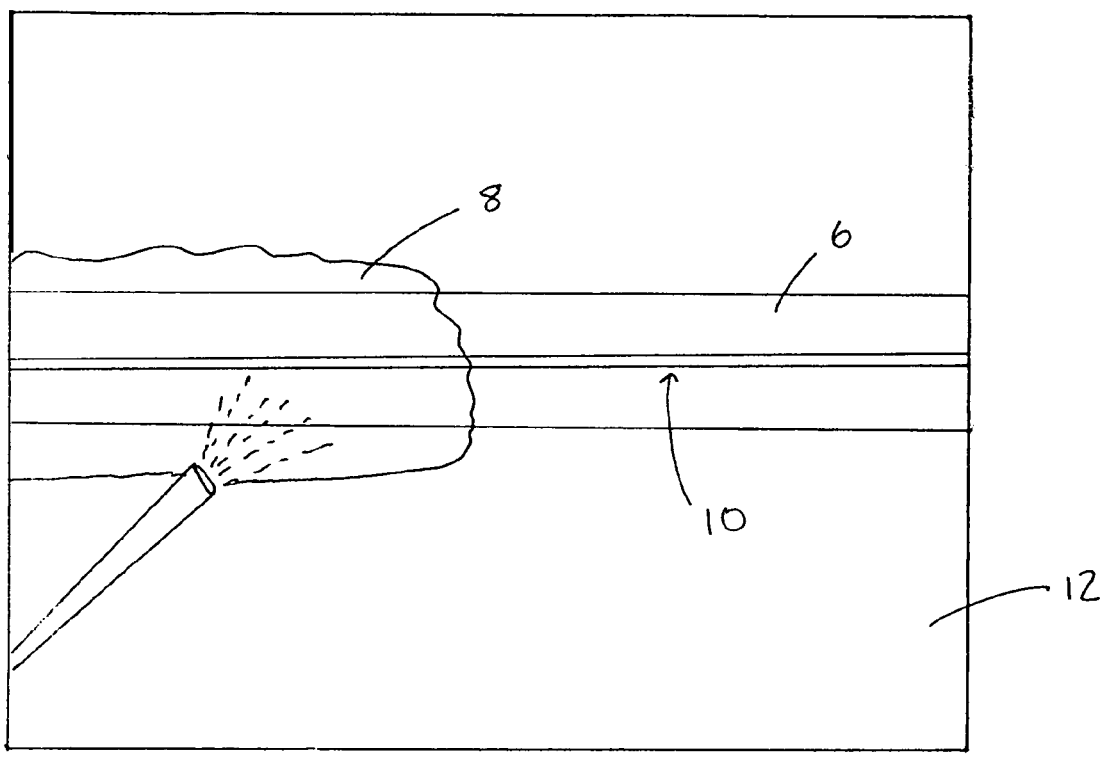
FIG. 3 depicts further depicts the current system wherein the preliminary coat is applied to the mesh covering the joint in the sheathing.
Figure 4:
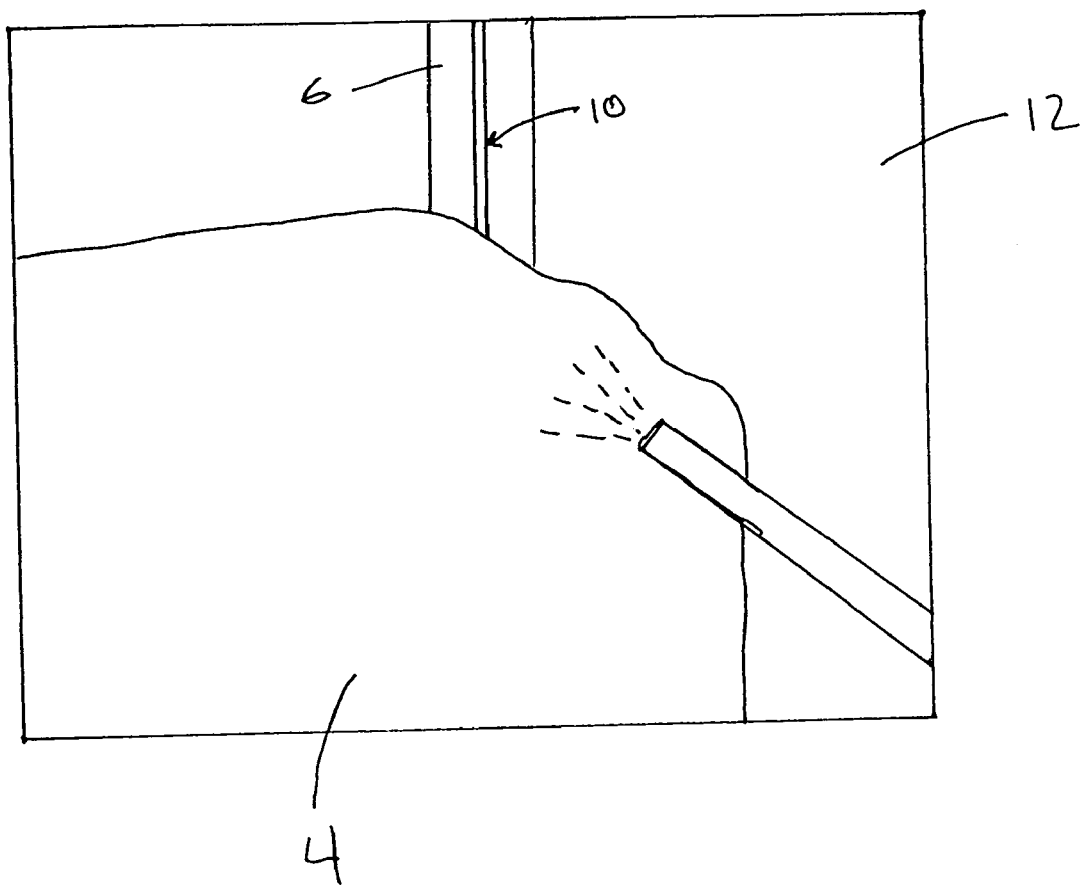
FIG. 4 further illustrates the current system wherein the application of the air and moisture barrier is shown.

As shown in FIG. 4 the liquid barrier 4 may be applied by spraying to liquid onto the sheathing 12. However, the liquid barrier 4 may be applied by most any means know in the art such as rolling, and/or brushing the barrier onto the sheathing 12. As depicted in FIG. 2, the system includes applying a reinforced mesh 6 over joints 10 formed in the outer substrate surface of the sheathing 12. An example mesh includes Sto Guard® Mesh available from Sto Corp of Atlanta, Ga. As shown in FIG. 3, a preliminary coating 8 such as Gold Fill® available from Sto Corp of Atlanta, Ga. may be further applied to the joints 10 and spot fasteners (not shown). Typically, the preliminary 8 coating is sprayed over the joints 10, mesh 6 and spot fasteners and then after the preliminary coat dries the liquid barrier 4 is applied.

While Applicants have set forth embodiments as illustrated and described above, it is recognized that variations may be made with respect to disclosed embodiments. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

The invention claimed is:

1. A system of providing an air and moisture barrier to a structure, comprising:
   applying to the structure a liquid formulation including a latex polymer and a cement retarder to form a barrier, wherein the barrier substantially lacks adhesion to a cementitious composition;
   applying a lath to the barrier; and
   applying to the lath a cementitious composition.

2. The system of claim 1, wherein the liquid formulation further includes a dispersant, a defoamer and fillers.

3. The system of claim 1, wherein the step of applying the liquid formulation to the structure is an application selected from the group consisting of spraying, rolling, brushing and combination thereof.

4. The system of claim 1, wherein the barrier is vapor permeable.

5. The system of claim 1, further including applying a reinforced mesh over joints in the structure.

6. The system of claim 1, further including a applying a preliminary coating over the joints in the structure.

* * * * *